United States Patent [19]

Durbin et al.

[11] 4,336,995
[45] Jun. 29, 1982

[54] PRECESSION SCANNING SYSTEM FOR COPIER DEVICE

[75] Inventors: John A. Durbin, Webster; David K. Shogren, Ontario, both of N.Y.

[73] Assignee: Xerox Corporation, Stamford, Conn.

[21] Appl. No.: 190,160

[22] Filed: Sep. 24, 1980

[51] Int. Cl.³ .............................................. G03G 15/28
[52] U.S. Cl. ........................................ 355/8; 355/11; 355/57; 355/60
[58] Field of Search ................... 355/8, 3 BE, 16, 11, 355/66, 56, 57, 60

[56] References Cited
U.S. PATENT DOCUMENTS

| | | | |
|---|---|---|---|
| 3,454,335 | 7/1969 | Caldwell et al. | 355/8 |
| 3,650,621 | 3/1972 | Lewis et al. | 355/8 |
| 3,754,822 | 8/1973 | Melrose | 355/8 |
| 4,101,218 | 7/1978 | Saruwatari et al. | 355/8 X |

Primary Examiner—Richard L. Moses

[57] ABSTRACT

The present invention is directed to an object scanning system wherein the illumination scanning means employed travels at a rate which is greater than that of a flat photoreceptor moving in the same direction. In one embodiment, a dual rate mirror assembly scans a document on a platen at a first rate which is greater than the process speed set for a photoreceptor belt. The image is projected through a lens and precessed by a mirror arrangement along the belt surface in a direction opposite to the belt travel. The precession rate can be set relative to the scanning flyback time, so as to reduce or eliminate an interdocument gap on the photoreceptor and to lower process speeds for a given copy rate.

8 Claims, 4 Drawing Figures

PRECESSION SCANNING SYSTEM FOR COPIER DEVICE

BACKGROUND AND PRIOR ART STATEMENT

This invention relates generally to a xerographic copying device and, more particularly to an optical system which scans a document lying in an object plane and projects the scanned image onto a moving flat photoreceptor at a rate faster than the rate of movement of the photoreceptor and in the direction opposite such photoreceptor movement.

Precession scan systems which expose images on a photoreceptor at a faster rate than the photoreceptor movement are known in the art. U.S. Pat. No. 3,454,335 (Caldwell) assigned to the same assignee as the present invention, discloses a method of projecting images on microfilm cards which are moved past a stationary lens and mirror system onto a drum photoreceptor. The drum and microfilm are moved at the same speed but the image is precessed (i.e. moved in a direction opposite to the drum motion) onto the drum surface by means of a slit aperture which moves in a direction opposite that of the drum. This combined slit and drum rotation exposes the drum at a speed (rate) that is greater than the surface speed of the drum. This scanning system demonstrates two of the advantages gained by image precession: the process speed of the system can be set at a lower speed, for equivalent copy rate (copies per minute) and the gap ordinarily present between images (due to the return time of the scan optics) can be reduced or eliminated if desired. Scan return velocities for a given copy rate can also be minimized for a given copy rate thus reducing scan accelerations, forces and vibrations. A problem with such a system, however, is that defocusing errors may result in developed images unacceptable for some systems. The errors are introduced because the image reflected from the drum mirror to the slit does not maintain perpendicularity to a tangential line at the drum surface.

This defocusing problem is addressed in copending U.S. Application Ser. No. 013,098 (Glab) assigned to the same assignee as the present invention. Glab solves the problem of field tilt in his particular scan system, by using linear and rotational motions of optical elements located near the drum surface to scan the image onto the drum at the angle corresponding to the angle of reflection of the image from the platen.

Another prior art device which utilizes precession onto a drum photoreceptor is disclosed in U.S. Pat. No. 3,650,621 (Lewis) also assigned to the same assignee as the present invention. Lewis discloses a system wherein an imaging device is moved in an arcuate path which is in a direction opposite to drum rotation to scan a document on a curved platen onto the drum.

Precession onto a flat photoreceptor surface introduces different problems requiring a different set of solutions. U.S. Pat. No. 3,754,822 (Melrose) also assigned to the same assignee as the present invention, a scan system wherein a platen and flat photoreceptor move synchronously in the same direction and the scan optics move in the opposite direction at a suitable speed. The disclosure and claims are limited to the specific system disclosed and do not address problems in systems which, for example, have a stationary object or which have a lens movement separate from that of a scan lamp movement. In higher volume copiers, a preferred method of scanning has been to utilize a full-rate, half-rate mirror system which maintains proper object-to-lens distance during the course of travel. Such a scan system is relatively heavy, however, and the above-mentioned flyback inertial problems constitute an important limitation on the speed of the system.

SUMMARY

It is, therefore, an object of the present invention to provide a scanning system which precesses an image from a stationary object onto a flat photoreceptor thereby reducing or eliminating the time ordinarily lost in returning scan components from an end-of-scan to beginning of scan position. It is a further object to provide a variable magnification precession scanning system. It is a still further object to provide a precession scan system to be used in a copier system employing a full-rate, half-rate scan system.

These objects are accomplished by a scanning system which includes a projection lens positioned along an optical path to transmit images from a stationary object plane to a moving image plane, scanning illumination means for scanning an object on said object plane, the illumination scanning rate being set at a greater value than the rate at which the image plane moves, so as to cause the image to be precessed (moved backward) onto the image plane in a direction opposite to the movement of said image plane.

DRAWINGS

For a better understanding of the present invention, reference may be had to the accompanying drawings in which.

DESCRIPTION OF THE INVENTION

Figure 1:
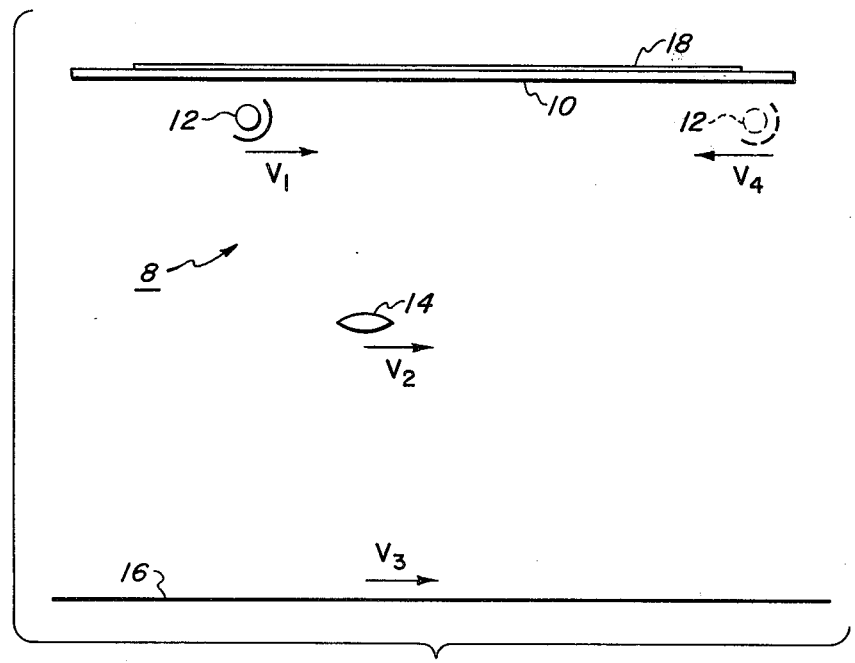
FIG. 1 shows a precession scan system utilizing a scanning illuminator lens and photoreceptor each of which have independent rates of movement.

Referring now to FIG. 1, there is illustrated a stationary document and flat platen to flat photoreceptor scanning system 8 comprising platen 10, a scan lamp/reflector assembly 12, lens 14, and photoreceptor belt 16. A document 18 to be copied is placed on platen 10. In operation lamp/reflector assembly 12 scans document 18 from left to right at a first scan velocity $V_1$. The reflected light image is projected through lens 14, also moving from left to right, at a second velocity $V_2$. The image is projected onto the surface of photoreceptor belt 16 moving at a third velocity $V_3$. At the end of scan, assembly 12 returns to the start of scan position at a fourth velocity $V_4$. As described in further detail below, the relationships between $V_1$, $V_2$, and $V_3$ can be so ordered that an image is projected onto the belt at a rate faster than the belt travel rate and in a direction opposite to the belt movement, i.e. the image is precessed onto the belt. A condition can also be created wherein the rescan, or flyback times of the scan elements, is sufficiently long to keep rescan vibrations to an acceptable level. A particularly interesting case is presented when the scan and rescan times are made equal. For this case, the lamp moves at twice the photoreceptor velocity. These relationships are further discussed in conjunction with FIG. 2 which has eliminated the platen of FIG. 1 for ease of explanation and simply defines the document size parallel to length of scan by points $P_1P_2$. At the start of scan, assembly 12 and lens 14 are in the solid line position. A portion of belt 16 equivalent to the document length $P_1P_2$ occupies a length defined by points AC with point C being the image of object point $P_1$. At the end of scan position, the assembly 12 has moved to its dotted line position illuminating point $P_2$, lens 14 has moved from a first position $L_1$ to a second position $L_2$ and belt 16 has moved to position BD with object point $P_2$ being imaged at image point B. The illumination assembly 12 moves at a rate greater than the photoreceptor causing the illuminated image area to back up (precess) as it is laid down. The precession distance is length BC and BC can be considered as the optical "window" through which imaging takes place. It is of interest to note that the actual image velocity is determined by the lens velocity and system magnification and must match the speed of the photoreceptor to avoid image blur.

As assembly 12 returns to its start of scan position, point B continues to move and can become imaging point C for the imaging of the next document. The conditions for accomplishing this are set forth below and specifically by Equations (1) to (5). The time it takes assembly 12 to scan the distance $P_1P_2$ is the scan time T given by the expression:

$$T = P_1P_2/V_1 \quad (1)$$

The distance $L_1L_2$ traversed by lens 14 is given by:

$$L_1L_2 = TV_2 \quad (2)$$

Belt 16 moves a distance AB (or CD) given by:

$$AB = TV_3 \quad (3)$$

Photoreceptor distance AC is equal to the system magnification (M) times the document size, or:

$$AC = MP_1P_2$$

Figure 2:
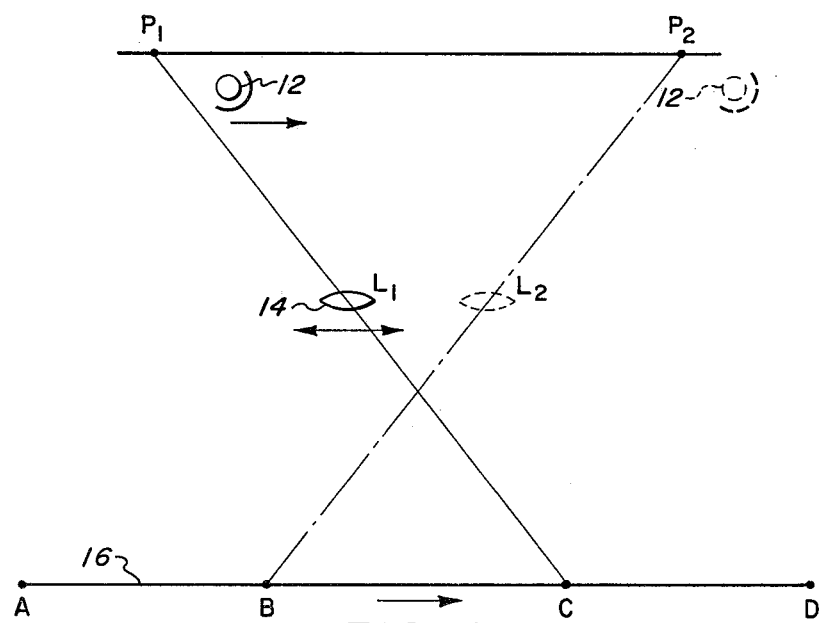
FIG. 2 is the diagram of FIG. 1 showing the precession of an object point onto the photoreceptor.

From FIG. 2, BC=AC−AB and therefore:

$$BC = MP_1P_2 - TV_3 \quad (4)$$

The condition for beginning the next scan with no interdocument gap (i.e. point B in FIG. 2 advancing to become the new start of scan object point C) is given by:

$$T_{FB} \text{ (flyback time)} = BC/V_3 = (MP_1P_2 - TV_3)/V_3 \quad (5)$$

For some systems, some amount of interdocument gap may be necessary and desirable, e.g. to allow copy paper to be properly synchronized with the image on the photoreceptor. The precession rates can be set to allow for a longer flyback time to provide a desired "dead" space between images. This longer flyback time also has the desirable effect of reducing system accelerations and vibrations. As an example, Equation (5) is modified as shown in Equation (6) to provide a 5" interdocument gap.

$$T_{FB} = (MP_1P_2 - TV_3 + 5")/V_3 \quad (6)$$

The bottom line of Table 1 shows the parameters for this case. A particularly interesting condition exists when the flyback and scan times are equal; i.e. when lamp velocity $V_1 = 9/\text{in/sec}$.

Table 1 provides examples for a specific system wherein belt velocity $V_3 = 7$ in/sec, lens velocity $V_2$ is $\frac{1}{2}$ of $V_3$ or 3.5 in/sec, M=1 and $P_1P_2 = 9.0$ inches. The effects of varying lamp assembly velocity $V_1$ are provided.

The above description serves to demonstrate the advantages derived from decoupling the illumination source from the imaging lens. To reiterate these advantages;

(1) longer flyback time for a given interdocument gap;

(2) lower process speeds for a given copy rate;

(3) lower illumination scan accelerations yielding lower system vibration.

The tradeoff for these advantages is the requirement to increase illumination scan speed and power and an increase in the optical window on the photoreceptor.

TABLE I

| Velocity Lamp ($V_1$) | 7.0 in/sec | 9.0 in/sec | 14.0 in/sec | 21.0 in/sec |
| --- | --- | --- | --- | --- |
| Lamp scan time | 1.29 sec | 1 sec | .64 sec | .43 sec |
| Lens scan length ($L_1L_2$) | 4.5 in | 3.5 in | 2.25 in | 1.5 in |
| Optical window Size BC | 0 in | 5.5 in | 4.5 in | 6.0 in |
| Flyback Time (0" Dead Space) | 0 sec | .29 sec | .64 sec | .86 sec |
| Flyback Time (5" Dead Space) | .71 sec | 1 sec | 1.36 sec | 1.57 sec |

Figure 3:
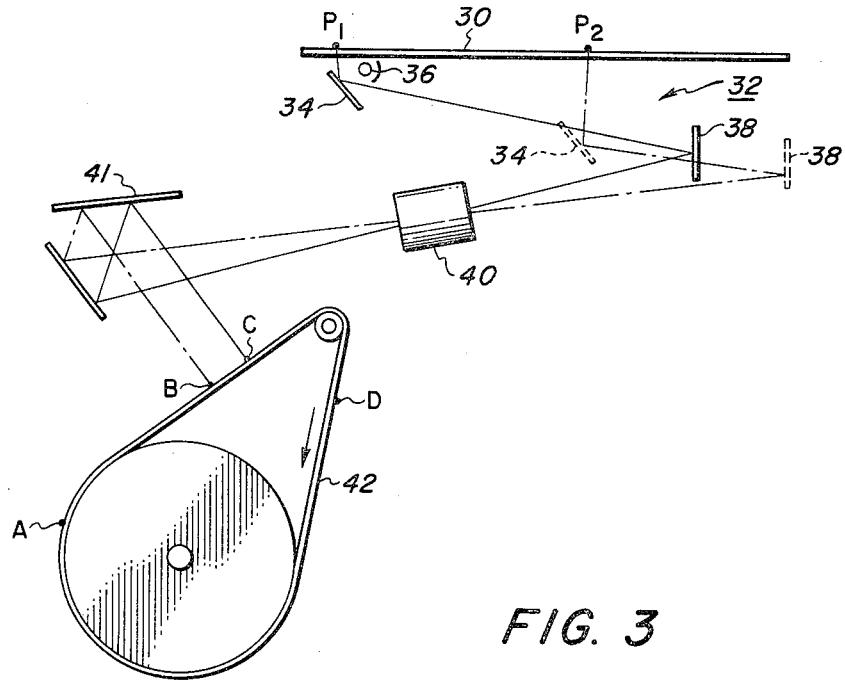
FIG. 3 shows a first embodiment of a precession scan system utilizing a full-rate, half-rate scanning assembly.

Referring now to FIG. 3, there is shown a 1:1 precession imaging system utilizing a fixed lens, moving mirror arrangement in a photocopier environment. A document 30, having a scan length distance defined by points $P_1P_2$ is supported on a platen (not shown). The document is scanned by a full-rate, half-rate scan system generally designated as 32. System 32 comprises mirror 34 and lamp assembly 36 moving at a first velocity $V_A$ and a second mirror 38 moving at a rate $V_A/2$. A reflected image of the document, represented by a principal ray traveling along the scanned axis of the document is imaged through stationary lens 40 and onto photoreceptor belt 42 via roof mirror 41. Belt 42 is moving at a velocity $V_B$.

In operation, and at start of scan, components 34, 36, 38 and 40 are in their solid line position. A portion AC of belt 42 is equal in length to $P_1P_2$ with point C defining the image point of object point $P_1$. Scan assembly 32 moves from left to right at a velocity $V_A$ which is purposely made larger then belt velocity $V_B$. The actual value to which $V_A$ must be set is derived from Equations (1), (3) and (4). In addition, copy rate $C_R$ and dead space are reflected by the following equation:

$$C_R = 1/(T + T_{FB}) = V_3/(P_1P_2 + D_p) \quad (7)$$

As a consequence, the image is laid down and precessed from point C towards point B on belt 42. At the end of scan position, assembly 32 is in the dotted line position and belt 42 has moved to position BD with document point $P_2$ being imaged at point B.

From Equation 5, and setting flyback time for 0" dead space, point B on the belt will move a distance BC during the time taken by scan assembly 32 to return to start of scan position. The new scan cycle will then begin at point C and a new image will be laid down beginning immediately next to the trailing edge of the previously exposed image (i.e. the interdocument gap is eliminated).

It is noted that the vertical position of mirror 34 changes during scan to maintain the ray bundles at the center of the mirror. The vertical position can be held constant if a larger size mirror were utilized. Although not shown in FIG. 3, the latent images formed on the belt 42 can be developed and transferred to copy paper and the belt cleaned and recharged by procedures well known to those skilled in the art.

Figure 4:
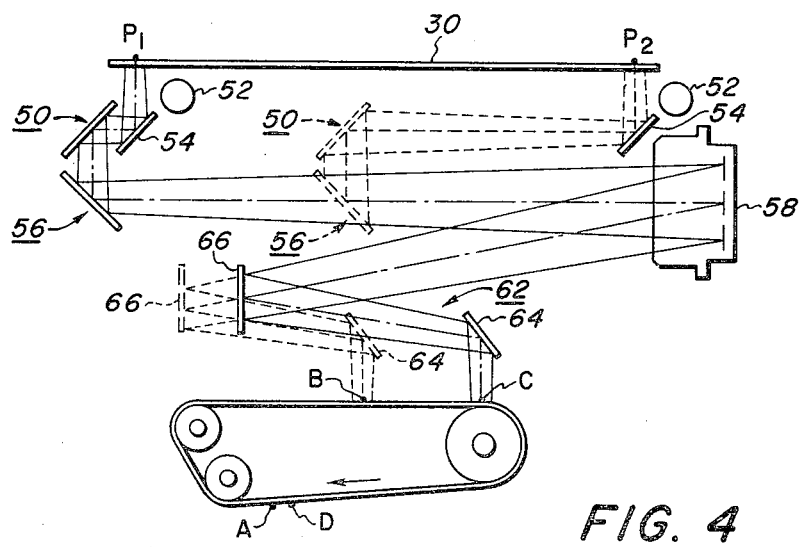
FIG. 4 shows a second embodiment of a precession scan system utilizing a full-rate, half-rate scanning assembly.

An alternate embodiment of a dual scan rate system is shown in FIG. 4. In this figure, document 30 is again supported on a platen (not shown). Scanning assembly 50 consists of lamp 52 and full-rate mirror 54 moving at a first velocity $V_A$ and a second roof mirror assembly 56 moving at a second velocity $V_A/2$ to maintain a constant object-to-lens distance. A reflected image of the document, again presented by a principal ray is imaged through catadroptic lens 58 and onto photoreceptor belt 60 via mirror assembly 62. Assembly 62 comprises mirrors 64, 66. Mirror 64 is moved in a direction opposite to the direction of travel of belt 60 and at a rate which accommodates travel along the chosen precession distance BC. Mirror 66 is linked to mirror 64 motion to maintain a constant lens-to-image distance and serves to fold the optical path and maintain correct image orientation for operation in transfer xerography.

In operation, the start of scan operation is initiated with components 52, 54, 56, 64, 66 in the solid line position. A portion AC of belt 60 equal to document length $P_1P_2$ will be exposed during the scan cycle with point C defining the image point of object point $P_1$. Scan assembly 50 moves from left to right at scan velocity $V_A$ greater then the velocity $V_B$ of belt 60. (In this embodiment, the vertical position of the scan assembly does not change since roof mirror assembly 50 accommodates the change in position of the reflected ray bundles.) Simultaneously, mirrors 64, 66 fold the projected image and reflect it onto the photoreceptor so that the image is precessed during scan a distance equal to BC. Point A reaches point B at the end of scan position; the time it takes point A to travel to point C can be set to equal the flyback time and the start of scan begins anew.

To summarize, precession of an image onto a photoreceptor is obtained by illumination scanning at greater than process speed. The precession distance times the process speed gives the added "free" flyback time. The ratio of the illumination scan and process speeds can be arbitrarily set so that varying amounts of precession can be accomplished. The image velocity must always equal the photoreceptor velocity or stated alternatively, the algebraic sum of the imaging component velocities must equal the precess speed. This allows the illumination speed to be chosen independent of process speed with the attendent advantages previously discussed.

Although the FIG. 3 and 4 embodiments have been disclosed in the environment of a dual-rate mirror scan system, other types of scanning systems may be employed. For example, a single mirror with related scan lamp assembly could be used in systems having sufficient interior space requirements. And, while dual rate system is shown in a unity magnification mode, operation at other magnifications is possible. For example, if a reduction mode of operation is desirable in the FIG. 4 embodiment, lens 58 can be adapted to translate along the optical axis to decrease the lens-to-image distance the required amount. Mirror 66 would be adapted for the additional component of motion to maintain the image in proper focus. Mirror 54 would also have to be positioned to establish proper lens to object distance.

What is claimed is:

1. A scanning system for projecting light images of a stationary object at an object plane along an optical path onto a flat photoreceptor in an image plane including means for moving said photoreceptor at a first rate of speed $V_3$, illumination means adapted to scan said object at a second rate of speed $V_1$ greater than that of said photoreceptor speed, and a scanning projection lens positioned along the optical path between said illumination means and said photoreceptor, and moving at a third rate of speed $V_2$ less than said first and second rates, whereby said scanned image is projected through said lens and imaged, in precession fashion, onto said photoreceptor in a direction opposite to the direction of travel of said photoreceptor.

2. The scanning system of claim 1 wherein the distance $D_p$ along the photoreceptor that the image is precessed is defined by the expression $$D_p = mL_d - T_s V_s$$

where
m = system magnification,
$L_d$ = length of object scanned,
$T_s$ = time elapsed from start-to-end of scan,
$V_s$ = rate of speed of the photoreceptor
and wherein the time taken to return said scanning means from one end of scan to start of scan position is at least equal to the time taken by said belt to travel said distance $D_p$.

3. An imaging system for a copying device wherein a document on a fixed platen is imaged onto a moving flat photoreceptor belt, said system comprising:

illumination scanning means for scanning said document includes means to move said scanning means from a start of scan position to an end of scan position at a first rate of speed $V_1$ and to return said scanning means to the start of scan position at a second rate of speed $V_2$, scanning projection means positioned along the optical path of said imaging system and adapted to project said scanned images towards said photoreceptor surface, reflection means positioned between said projection means and said photoreceptor and adapted to direct said projected image in substantially perpendicular orientation onto said photoreceptor, and means to drive said photoreceptor at a third rate of speed $V_3$ less than that of said first rate of speed, whereby said reflected image is projected onto the photoreceptor in a direction opposite the motion of the photoreceptor and along a distance $D_p$.

4. The imaging system of claim 3 wherein said scanning system includes an illumination source and scan mirror connected as an assembly to move at said first rate of speed and a second mirror moving at one half said first rate to maintain a constant document to lens distance.

5. The imaging system of claim 4 wherein said reflector means is a roof mirror.

6. The imaging system of claim 3 wherein the distance $D_p$ is defined by the expression $$D_p = mL_D = T_s V_3$$

where
m = system magnification
$L_D$ = length of document scanned
$T_s$ = time elapsed from start of scan to end of scan $L_D/V_1$ and wherein the time $T_r$ taken to return said scanning means from end of scan to start of scan $(T_r = L_D/V_2)$ is at least equal to the time taken by said belt to travel said distance $D_p$ $(T_p = D_p/V_3)$.

7. The imaging system of claim 3 wherein said scanning system includes an illumination source and scan mirror movable as an assembly at said speed $V_1$ and a roof mirror assembly adapted to move at a speed $V_1/2$.

8. The imaging system of claim 7 wherein said reflector means is a pair of mirrors adapted to move during said scan time, in a direction of motion opposite to that of said photoreceptor.

* * * * *